United States Patent [19]

Gulette et al.

[11] 4,385,737

[45] May 31, 1983

[54] COMFORT LOCK RELEASE SYSTEM

[75] Inventors: Ronald S. Gulette, Farmington Hills; James A. Gavagan, Centerline; Carl M. Petersen, III, Drayton Plains; Steven L. Squires, Ortonville, all of Mich.

[73] Assignee: Irvin Industries Inc., Madison Hts., Mich.

[21] Appl. No.: 218,661

[22] Filed: Dec. 22, 1980

[51] Int. Cl.³ .................. A62B 35/02; B65H 75/48
[52] U.S. Cl. .................... 242/107.7; 280/807; 280/808
[58] Field of Search ........ 242/107.7, 107.6, 107.4 R, 242/107.4 E; 280/801–808; 297/474–480

[56] References Cited

U.S. PATENT DOCUMENTS

| | | | |
|---|---|---|---|
| 3,834,646 | 9/1974 | Heath | 242/107.7 |
| 3,858,826 | 1/1975 | Sprecher | 242/107.7 |
| 4,002,311 | 1/1977 | Fisher et al. | 242/107.7 |
| 4,023,746 | 5/1977 | Magyar | 242/107.7 |
| 4,060,211 | 11/1977 | Takada | 242/107.7 |
| 4,108,395 | 8/1978 | Heath | 242/107.7 |
| 4,241,938 | 12/1980 | Patel et al. | 242/107.7 X |
| 4,307,853 | 12/1981 | Higbee et al. | 242/107.7 |

Primary Examiner—John M. Jillions

[57] ABSTRACT

An automatic comfort lock release for an automotive vehicle retractable shoulder belt assuring complete retraction of the shoulder belt upon occupant departure from the vehicle seat. Sensing of automatic lap belt retraction having no comfort lock feature is employed to release the comfort lock and, in dual spool installations, a lever adjacent the lap belt spool sensing lap belt windup releases the comfort lock.

3 Claims, 11 Drawing Figures

COMFORT LOCK RELEASE SYSTEM

BACKGROUND OF THE INVENTION

In seat belt systems for automotive vehicles employing retractable shoulder belts it is common practice to employ a "comfort feature" which relieves spool spring windup pressure from constant application to the occupant's shoulder belt. After initial belt extension to accommodate the occupant's size, seat position, buckling and spring retraction to take up slack in the shoulder belt, the occupant may extend the belt slightly to a pressure relief position whereupon a comfort lock engages to prevent spring retraction tension from causing discomfort to the occupant. Standard functional requirements for the comfort lock feature include the following:
1. the belt webbing from the retractor must extend to a working range of the belt with approximately 25% (6½") still wound on the spool;
2. the belt should then retract under spring windup tension a minimum of 6" to the occupant's normal restraint position (12.5" on spool);
3. extraction of the belt in the order of 1" should engage the comfort lock to prevent retraction;
4. subsequent extraction, to accommodate reaching to the instrument panel or glove compartment, in the order of 4" should be possible followed by return of the belt to within 1" of the comfort lock position previously set without releasing the comfort lock for full retraction;
5. extraction of the belt from comfort lock position a distance exceeding that for normal maneuvering, e.g. in the order of 6", followed by release should cause the belt to fully retract without locking.

Such requirements have been met in at least two basic systems. One is known in the art as a ratchet scroll/scroll follower system such as shown in U.S. Pat. Nos. 4,002,311, 4,165,054 and 4,149,683. The second type, preferred by applicants, involves the use of spring loaded friction elements to control pawl engagement and release of a comfort lock, under required conditions of webbing extraction and release, such as shown in U.S. Pat. No. 3,834,646 reissued as RE. 29,095, 4,060,211 and 4,053,116.

One of the problems encountered in such comfort feature systems is the possibility of the comfort lock retaining the shoulder belt in extended position upon buckle disengagement by the occupant in leaving the seat so that free webbing may hang out of the car upon door closure or otherwise fail to retract when a new occupant enters and buckles the seat belt. One answer to this problem has been to provide an electro-magnet or mechanical door opening responsive release for the comfort lock so that full shoulder belt retraction will occur whenever the occupant opens the door to leave the seat. Such comfort lock release systems involve substantial expense and complexity due to the remoteness of the actuating linkage relative to the shoulder belt takeup spool. Accordingly, similar less expensive systems for releasing the comfort lock have been sought by those involved in the art with various suggestions for sensing means which would reflect occupant departure from the seat, e.g. sensing means responsive to automatic retraction of the lap belt on a separate spool which is not equipped with a comfort lock and accordingly is always automatically retracted upon occupant unbuckling to leave the vehicle seat. Applicants' have responded to this suggestion and pursued this approach in developing the present comfort lock release which is simpler, less expensive and more dependable than any known in the prior art.

SUMMARY OF THE INVENTION

In solving the problem of simplifying comfort lock release, applicants have employed the lap belt sensing movement of a lever responsive to increasing diameter of webbing on the lap belt spool to achieve direct retraction of a comfort lock pawl of the second type of friction brake system which in a preferred embodiment is in immediate proximity to the lap belt spool thereby providing a direct simplified comfort lock release whenever the lap belt has reached a predetermined substantially retracted position.

In developing this approach to a simplified solution to the comfort lock release problem, applicants encountered two subordinate problems which have also been solved in the preferred embodiment of the present disclosure; one relating to a technique required for assembly of the friction elements to incorporate the linkage connection of the present comfort lock release, and the other to the limited force available from the lap belt spool windup spring for actuating the lever to produce a ratchet-pawl release of the comfort lock. Thus, a normal tooth form for the comfort lock ratchet when engaged by the pawl of the comfort lock under normal belt retraction tension would resist disengagement through the leverage system responsive to spool windup of the webbing. This problem was solved by opening the tooth angle of the comfort lock ratchet under the prevailing coefficient of friction at the contact between pawl and ratchet tooth so as to provide a minimum self-locking angle and thereby minimize the force required to disengage the pawl.

The use of a lap belt retraction sensing lever to achieve direct retraction of comfort lock pawl combined with the foregoing described special ratchet tooth form, provides adequate accommodation for tolerance variations, sufficient leverage for releasing the pawl and reliable operation notwithstanding the limited windup spring forces.

DETAILED DESCRIPTION OF THE PREFERRED EMBODIMENT

Figure 1:
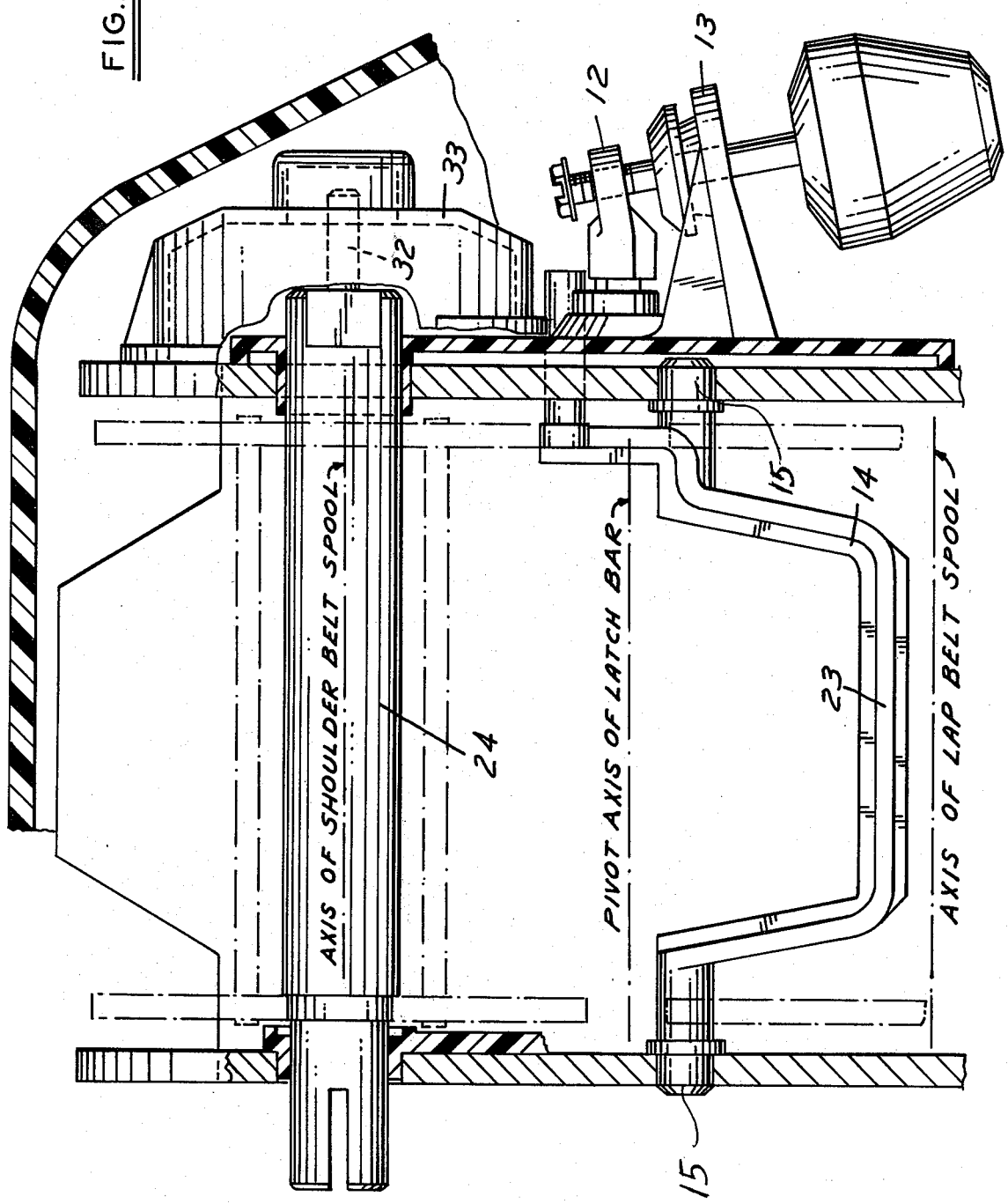
FIG. 1 is a fragmentary sectional view taken in the plane of the axes of the dual spool retractor illustrating the relative orientation of the inertia element, dual spool and locking bar axes, comfort lock and release lever.
Figure 2:
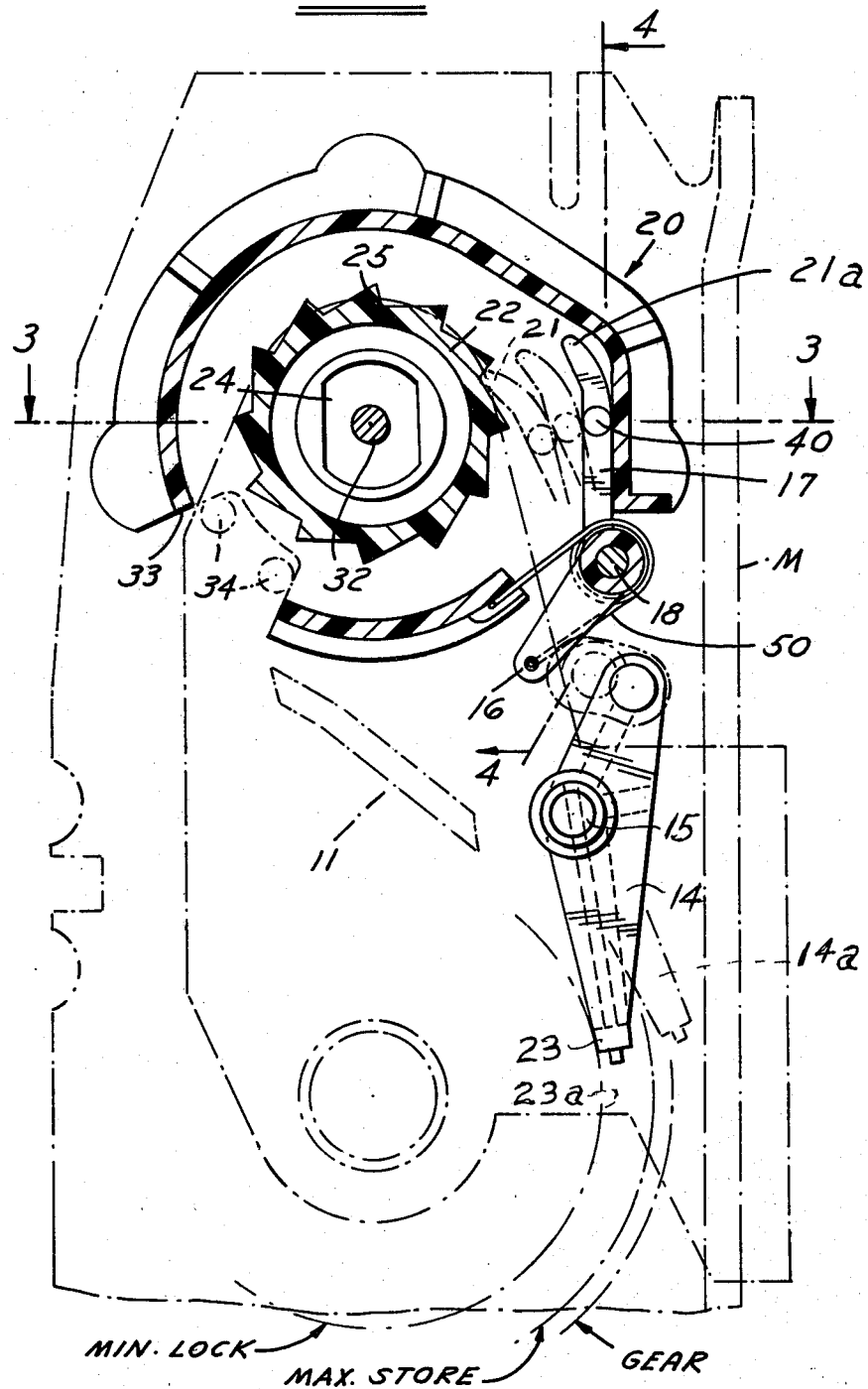
FIG. 2 is a fragmentary sectional view of the comfort lock release system of the present disclosure taken normal to the dual spool axes.
Figure 3:
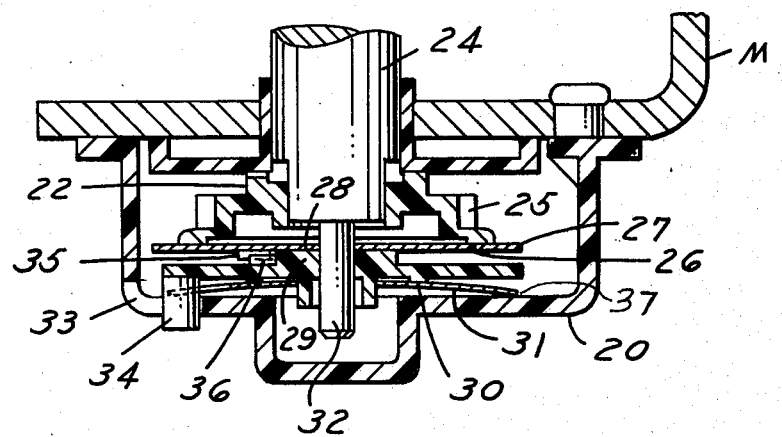
FIG. 3 is a fragmentary sectional view of the friction disc system for controlling the comfort lock feature taken along the line 3—3 of FIG. 2.

With reference to FIGS. 1, 2 and 3 the general relationship of the axes of shoulder and lap belt spools of the dual spool retractor and pivot axis of the latch bar for locking the spools against webbing extension in response to high deceleration forces on the inertia sensor may be seen. An extension 12 of the latch bar normally is controlled as to tilt angle by the inertia sensor suspended from a bracket 13 so as to establish a latch bar locked angularity as shown at 11 in FIG. 2 under emergency deceleration forces in order to prevent webbing extension and establish passenger restraint.

Under normal operation with the seat and lap belts extended for occupant use, the latch bar will assume a free disengaged position, in which position the block out lever 14 pivotally mounted at 15 to the side frame mount M for the reels will be as drawn in full line, inoperative to engage extension 16 of pawl 17 pivoted at 18 within a bearing 19 of comfort lock cover 20 so that pawl nose 21 will be free to engage ratchet wheel 22 as shown in dotted line at its innermost position or to disengage the ratchet as shown in dotted line at its intermediate position under the control of the friction elements of the comfort lock, as later described, free of interference from the block out lever 14. A light coiled spring 50, shown in FIG. 2 and FIG. 5a in installed position, biases pawl 17 toward a ratchet engaging position.

Upon occupant unbuckling of the lap belt and retraction of its webbing on the lower lap belt spool, web follower 23 is actuated by lap belt spool webbing 23a as it increases in diameter upon reaching fully retracted "MAX. STORE" position to move block out lever 14 to its outermost pawl disengaging position 14a corresponding to the pawl position 21a overcoming the bias of spring 50 thereby releasing the comfort lock in a manner overriding the normal control of the friction elements now to be described.

With reference to FIG. 3 the elements of the comfort lock include retractor shaft 24 in positive driving engagement with ratchet wheel 22, teeth 25 of which are normally engaged by pawl nose 21 and outer annulus 26 of which frictionally engages follower disc 27 which in turn frictionally engages adjacent projecting surface 28 on rest element 29 which in turn is provided with an annular projecting ring 30 engaging leaf spring 31 for holding the stack of elements under predetermined compressive pressure engagement. While ratchet 22 is positively driven by shaft 24, disc 27, piloted on cylindrical stem extension 32 of shaft 24, is only frictionally driven by sprocket wheel 22 within limits as will now be described with reference to the three figures 5b, 5c and 5d.

Notch 33 in fixed housing 20 engaged by rest projection 34 limits the pivotal movement of rest 29 (as shown in alternative limit portions in FIG. 2) while relative pivotal movement between follower 27 and rest 29 is limited by projection 35 struck from follower disc 27 interengaging with molded projection 36 extending from the surface of rest 29 so that pivotal movement of follower disc 27 within housing 20 in either clockwise or counterclockwise direction is limited substantially to a single revolution plus the angular opening of notch 33.

Successive elements ratchet wheel 22, follower 27, rest 29 and spring 31 are preferably constructed with dissimilar contacting surfaces, e.g. alternately plastic, metal, plastic and metal or vice versa, and their respective radii of frictionally engaging surfaces effectively control predominant frictional driving and braking forces. Thus, the relatively large radius of engagement between ratchet wheel 22 and follower 27 will overcome any frictional resistance of relatively small diameter surface 28 of rest 29 which in turn will not be driven frictionally by follower 27 through engagement with surface 28 due to the larger radius of annulus 30 engaging spring 31 and larger effective radius of spring extensions 37 engaging plastic cover 20. However, the frictional drive of follower 27 will be effective upon positive engagement of projections 35, 36 to drive rest 29 within the limits of notch 33 overcoming any frictional resistance in engagement of annulus 30 with spring 31 due to the relatively larger radius of the driving contact 26.

Figure 5A:
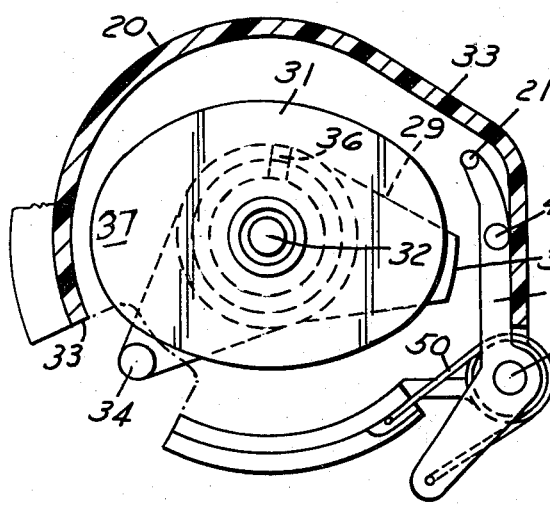
FIG. 5a is a schematic view of the principal friction elements controlling safety lock pawl engagement in an orientation illustrating installation.

FIG. 5a shows the installation relation of friction elements including oval spring 31 (omitted from FIGS. 5b–5d for clarity) as adapted to facilitate assembly.

Figure 4:
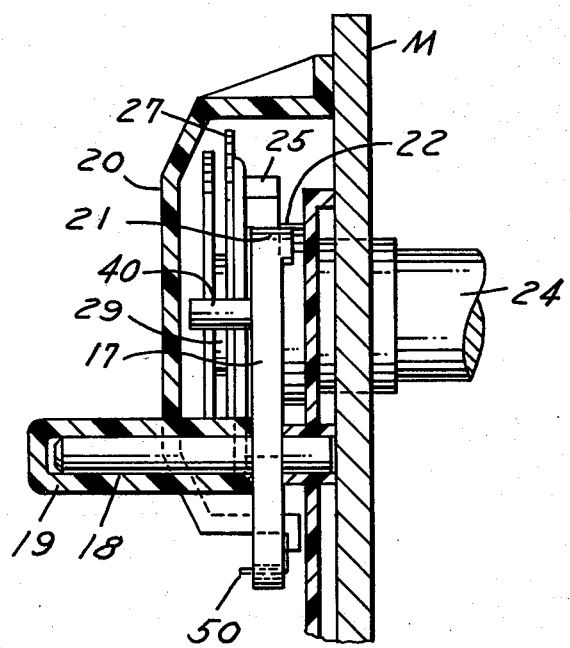
FIG. 4 is a fragmentary partially sectioned side elevation taken along the line 4-4 of FIG. 2.
Figure 5B:
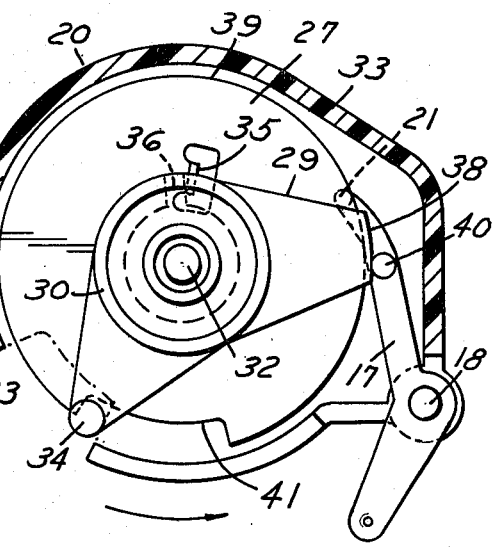
FIG. 5b is a view similar to FIG. 5a showing the orientation of such friction elements with the shoulder belt extracted.
Figure 5C:
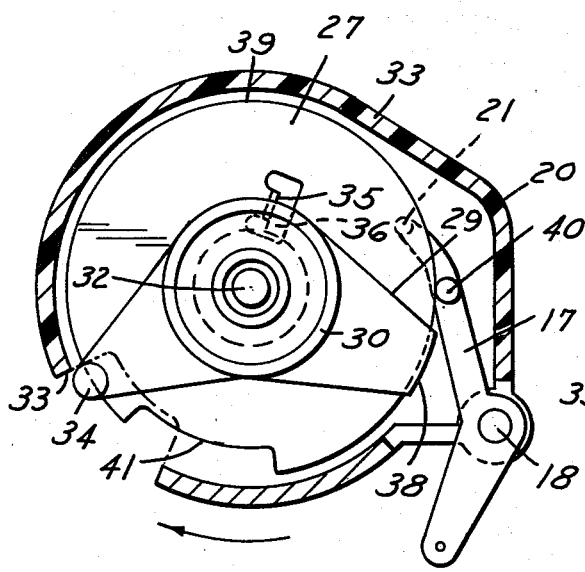
FIG. 5c is a view similar to FIG. 5b with the shoulder belt released to an occupant restraining position.

With reference to FIG. 5b, it will be understood that upon initial extension of the seat belt upon occupant entry and extension for buckling, rotation of shaft 24 in a counterclockwise direction will frictionally drive follower 27 and, through positive engagement of projections 35 and 36, rest 29 into the position shown where both extension 38 of rest 29 and outer circumference 39 of follower disc 27 will serve to hold pawl nose 21 out of engagement with ratchet wheel 22 through registration of molded projection 40 extending laterally of pawl 17, as shown in FIG. 4, past the plane of follower 27 and rest 29. Following extension of the shoulder belt webbing at least 6" past the final restraining length to accommodate buckling, resulting in the positioning of follower 27 and rest 29 in a pawl lock out location as shown in FIG. 5b, and the release of the shoulder belt webbing at least 6" to a restraining position, clockwise rotation of follower 27 producing engagement of follower projection 35 with the opposite side of rest projection 36 will then move the rest to the other limit position of rest projection 34 relative to notch 33 as shown in FIG. 5c where rest extension 38 will reach a clearance position relative to pawl stop projection 40 leaving only the arcuate surface 39 of follower 27 in block out engagement with projection 40.

Figure 5D:
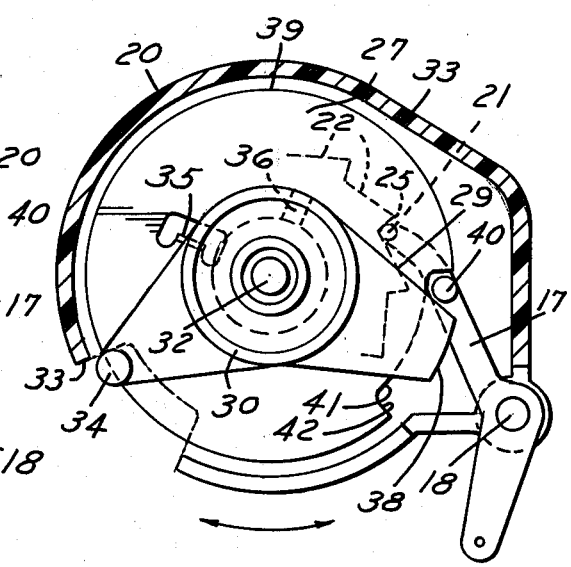
FIG. 5d is a view similar to FIG. 5c showing the friction elements in a position with the webbing slightly extended to comfort position.

A slight extension of the shoulder belt webbing, in the order of 1" plus, will next produce counterclockwise rotation of follower 27 to a position where recess 41 in its perimeter will align with stop projection 40 permitting pawl nose 21 to engage ratchet tooth 25 as shown in FIG. 5d thereby preventing further retraction of shoulder belt webbing and providing the comfort feature of relieving shoulder belt tension on the occupant. Once the comfort feature is so engaged reextension of the shoulder belt webbing up to 4" in order to accommodate occupant reaching to the dashboard or glove compartment will not result in movement of rest 29 due to the smaller effective frictional radius of rest surface 28 engaged by follower 27 relative to the effective brake surface contact of rest annulus 30 with leaf spring 31 so that counterclockwise movement of follower 27 until its projection 35 reaches rest projection 36 may take place without displacing rest 29 from its non-block out position as shown in FIG. 5d.

Limited extension of the shoulder belt webbing up to approximately 4" may result in counterclockwise rotation of follower 27 past the extremity of recess 41 which will cause ramp surface 42 to move the pawl of a non-engagement position. However, return of the occupant to normal position will result in clockwise rotation of follower 27 and re-engagement of the pawl within no more than one ratchet tooth spacing difference in the retraction arrested position of the shoulder belt webbing. If the occupant should reach further than the approximate 4" extension of shoulder belt webbing past the point where follower extension 35 re-engages rest extension 36 the rest will be moved once more to a pawl block out position and full retraction of the shoulder belt webbing will be possible without further arrest by the comfort lock. Reestablishment of the comfort lock will of course be possible by any extension of the shoulder belt webbing a minimum of 6" past the occupant restraining position to bring about the FIG. 5b relationship of follower 27 and rest 29 and a repeat of the comfort lock setting sequence previously described.

It is to be noted that the alternating dissimilar materials such as plastic to metal, metal to plastic, and plastic to metal frictional engaging surfaces of the respective ratchet 22, follower 27, rest 29 and spring 31 are desirable in maintaining a reliable uniform effective frictional coefficient throughout the life of the device so that the driving engagement between follower and rest will always be limited to relative engagement of projections 35 and 36 and so that the frictional drive of follower 27 by ratchet friction surface 26 will always be sufficient to overcome the frictional resistance of spring 31 on rest friction annulus 30 when drive is established through projections 35, 36 subject to the limits of projection 34 relative to notch opening 33.

Figure 6:
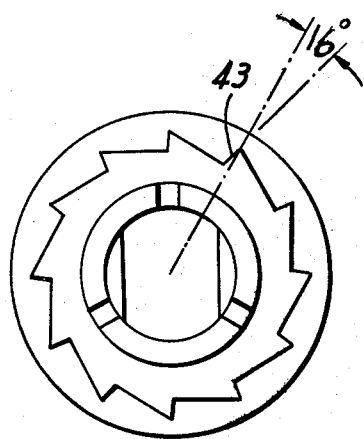
FIG. 6 is an end view of the ratchet wheel of the comfort lock.

With reference to FIG. 6 the preferred embodiment of ratchet wheel 22 includes 12 teeth spaced 30° apart with a 16° open slope to the pawl engaging face 43 of each tooth relative to a radial line passing through the apex of a tooth, such radial line forming an obtuse angle of 98° relative to a line passing from the pawl pivot point to the engaged contact point of pawl and tooth. Such tooth slope provides an 8° component of disengagement assist in the release of pawl 17 through the operation of block out lever 14 in response to the spool windup of lap belt webbing subject to a somewhat limited windup spring torque. The 8° slope is chosen relative to an effective coefficient of friction of 0.1 between the engagement surfaces of a diecast pawl and plastic ratchet wheel to provide a minimum locking angle for resisting retraction forces on the webbing so that a slight torque on the pawl imparted by the block out lever 14 will be sufficient to release the pawl which is lightly spring biased toward an engaging position.

Figure 7:
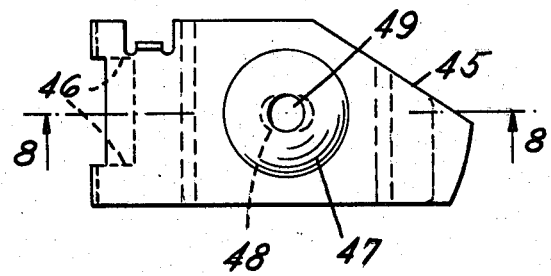
FIG. 7 is a plan view of an alternate integral spring and rest modification to take the place of two separate elements in the comfort lock of the first embodiment.
Figure 8:
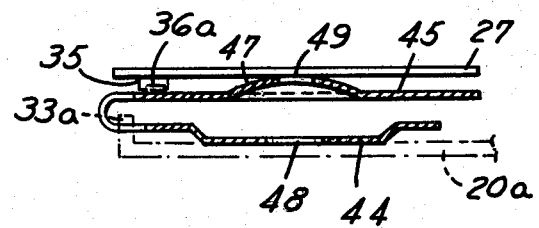
FIG. 8 is a sectional view taken along the line 8—8 of FIG. 7.

With reference to FIGS. 7 and 8 a modified integral construction of combined spring and rest is illustrated to be preassembled to the cover and serve the purposes of the separate spring 31 and rest 29 of the main embodiment, thereby somewhat simplifying the assembly of the respective elements without regard to their circumferential orientation about the pivotal axis of cylindrical stem 32. In such modified construction the spring base 44 will pivot with the upper rest portion 45 within limits provided by recessed opening 46 relative to fixed stop 33a provided in the housing (not shown). The figures show the integral unit as if compressed, as it would be in operative relation relative to follower 27, and a spherically crowned contour 47 at the top of the rest portion assures a predominant frictional resistance to pivotal movement between the base 44 and housing 20a to limit drive between follower 27 and the integral unit to contact between follower projection 35 and rest projection 36a as required for proper operation. A slot 48 in the base eliminates the need for precise alignment with the pivotal opening 49 in the crown 47.

The memory of both embodiments provides a predetermined comfort feature lock position corresponding to approximately ¾" webbing extension from initial full restraining position. Such memory will be preserved regardless of temporary extensions up to 4" from occupant movement in reaching to the dashboard or glove compartment. This is unique in applicant's construction relative to prior art comfort features which have the characteristic of different adjustable latch engagement positions depending on how far the webbing is extended from its initial full restraining position. Thus, as many as four adjustable positions ranging from ⅜" of an inch to 1¼" of extension is typical in prior systems wherein any temporary extension from occupant reaching within the memory range may result in a new adjustment or webbing looseness; thus if the occupant reaches beyond the 1½" last adjustment, maximum looseness would result upon his return to normal sitting position and in order to restore an initial lesser looseness adjustment it is necessary to repeat the full process of webbing extension beyond the memory range, retraction to full restraining position, and readjustment to the desired one of the first three adjustment positions. This is somewhat confusing to the occupant and applicant's approach of a predetermined single degree of looseness is preferred.

We claim:

1. An automotive vehicle dual spool retractable seat belt system automatically locked against extension in occupant restraining position under emergency deceleration conditions, including an automatically retractable shoulder belt having comfort lock means with one-way ratchet and pawl for arresting webbing retraction upon initial extension and retraction to an occupant restraining position followed by slight extension to a comfort position, said comfort lock means including a plurality of annular friction means responsive to shoulder belt spool rotation normally controlling actuation of the comfort lock pawl, a shoulder belt spool windup shaft extension adapted to drive said one-way ratchet, and an automatically retractable lap belt without comfort means to arrest retraction, characterized by an automatic shoulder belt comfort block out means including mechanical means responsive to increasing diameter of webbing wound on the lap belt spool and linkage means responsive to said mechanical means for blocking said pawl from engaging said ratchet, said pawl comprising a bellcrank element actuated by said linkage means, and each ratchet tooth face engaged by said pawl being provided with an open angle in excess of 90° relative to a line passing from the pawl contact point through the center of the pawl pivot in order to provide a component of force from torque on said ratchet assisting pawl disengagement.

2. An automotive vehicle dual spool retractable seat belt system automatically locked against extension in occupant restraining position under emergency deceleration conditions, including an automatically retractable shoulder belt having comfort lock means with one-way ratchet and pawl for arresting webbing retraction upon initial extension and retraction to an occupant restraining position followed by slight extension to a comfort position, a plurality of annular friction means responsive to shoulder belt spool rotation normally controlling actuation of the comfort lock pawl, said friction elements for controlling the comfort lock including a plastic ratchet wheel positively driven by the wind-up spool for shoulder belt webbing, a metal disc follower frictionally driven by an annular surface of said ratchet wheel, a rest element positively driven within a restricted angular range by interengaging projections between said follower and rest element operative for driving said rest element in either angular direction within said restricted range with substantially 360° lost motion between said follower and rest element in reversing the direction of drive, a spring element for maintaining effective frictional engagement pressure between said friction elements, and an automatically retractable lap belt without comfort means to arrest retraction, characterized by an automatic shoulder belt comfort block means including mechanical means responsive to increasing diameter of webbing wound on the lap belt spool and linkage means responsive to said mechanical means for blocking said pawl from engaging said ratchet.

3. A system as set forth in claim 2 wherein said rest and spring elements are constructed as an integral metal spring and rest element.

* * * * *